Aug. 6, 1935.    C. J. KOHLER    2,010,088

PRESSURE REDUCING VALVE

Filed May 15, 1933

Carl J. Kohler
INVENTOR

BY Lyman C. Conger
ATTORNEY

UNITED STATES PATENT OFFICE 2,010,088

PRESSURE REDUCING VALVE

Carl J. Kohler, Kohler, Wis.

Application May 15, 1933, Serial No. 671,159

2 Claims. (Cl. 251—154)

My invention relates to improvements in pressure reducing valves of a type adapted to be interposed in a fluid supply line, whereby fluid may be delivered from said line at a pressure substantially less than that obtaining in the supply portion of the line. It is an object of my improvement to provide a reducing valve which is efficient in operation, inexpensive to manufacture, and which requires little or no maintenance.

It is a further object of my improvement to provide a reducing valve which is quiet in operation and thus obviate the usual hissing or whistling noises attendant upon the operation of reducing valves, thereby rendering my improved valve adaptable to use in locations, such as bathrooms, where such noises are objectionable.

A still further object of my improvement is to provide for locking said valve so that a predetermined maximum adjustment or opening may not be exceeded.

One contemplated use of my invention is in connection with the water supply connections to water closet bowls or other plumbing fixtures flushed by a water supply. The noise attendant upon the flushing of such fixtures and the refilling of the supply tank is, in many instances, highly objectionable, and it has long been desired to eliminate or reduce such noise to a minimum. A low water pressure tends to reduce the noise, while a high pressure increases it. It is desirable, therefore, to keep the water pressure as low as possible, consistent with satisfactory operation of the fixture. This has, heretofore, been impractical in practice, since water pressures vary greatly in different localities and even in the same installation; for example, the upper and lower floors of a tall building, with the result that a fixture which is quiet in one location under a low water pressure may be objectionably noisy in another location.

I have discovered that the foregoing difficulty may be obviated by interposing a pressure-reducing valve in the water supply to the fixture and adjusting the valve to obtain a pressure at or near the minimum for satisfactory operation of the fixture. It is important, however, that the valve itself be silent in operation, so that the reduction in the noise created by flushing the fixture be not offset by hissing, whistling or gurgling in the valve itself.

Other adaptations and uses for the hereinafter described reducing valve will readily occur to those skilled in the art.

Figure 1:
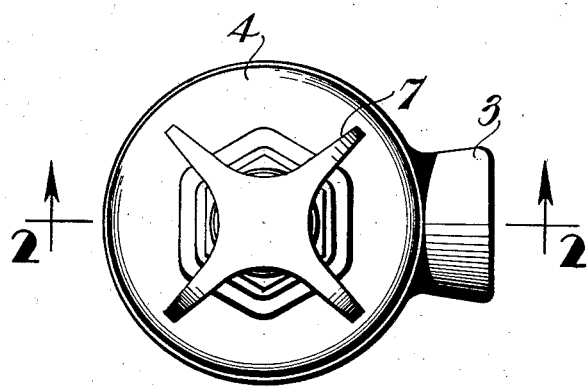
Figure 2:
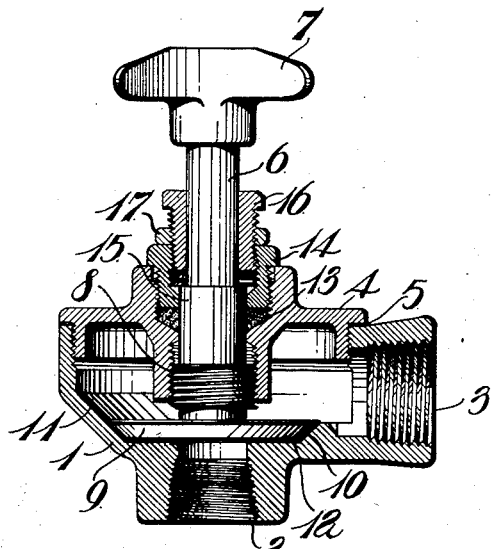

With the foregoing and other objects in view, the improvement consists in the valve hereinafter described and illustrated in the accompanying drawing, in which Figure 1 is a plan view of said reducing valve, and Fig. 2 is a sectional view thereof taken along the lines 2—2 of Figure 1.

Similar numerals refer to similar parts throughout the several views.

The valve body 1 is provided with the threaded inlet 2 and the threaded outlet 3. The body 1 is also threaded to receive the bonnet 4. The gasket 5 is interposed between the body 1 and the bonnet 4 and provides a seal against leakage.

A valve stem 6, provided with an operating handle 7, is threaded into the bonnet at 8 and is provided, at its lower extremity, with the valve 9. The valve 9 is provided with a beveled face 10 adapted to seat on a similarly beveled portion or seat 11 of the body 1. As will be seen from Fig. 2, the bevel 11 extends upwardly at the same angle for a considerable distance beyond the valve 9. This construction is important, since it prevents dead spaces and eddying, which would cause hissing or whistling of the valve. It will also be understood that the bevel 11 extends entirely around the inner circumference of the valve body 1 except for the small portion at the outlet 3.

It will also be observed that the valve body 1 has a flattened area corresponding to the flattened contour of the valve 9 circumjacent the inlet 2 so as to leave only a narrow aperture 12 between the body and the valve 9 when the latter is seated on the seat 11 which is circumjacent the flattened area.

The bonnet 4 is provided with the customary packing 13 and packing gland 14 to prevent leakage around the valve stem. It will also be noted that the valve 9 is considerably larger than the inlet 2, for example, having a diameter three times that of the inlet. It will be understood that this proportion is illustrative only, and may be varied considerably.

The valve is shown seated in Fig. 2, in which position it acts as a shut-off valve. As the valve is raised from its seat, fluid is allowed to pass from the inlet 2 through the aperture 12 and between the bevel 11 and the beveled face 10 of the valve. The fluid is thus required to travel a narrow passage, and the friction thereby created is very effective in reducing the pressure, as is also the fact that the water is discharged from a relatively narrow passageway into a larger chamber.

It will thus be seen that the valve may be adjusted to secure any desired pressure, regardless of the original pressure of the supply.

In installations such as plumbing fixtures, the pressure is adjusted so as to give the quietest possible action consistent with efficient action of the fixture. Since the valve also may be used as a shut-off valve, it is desirable that some means be provided whereby the same adjustment may be obtained when the valve is reopened without the necessity of again testing to secure the best adjustment. It is also desirable to prevent the valve from being accidentally or intentionally opened farther than the original adjustment by unskilled persons.

To accomplish these objects, I provide the valve stem 6 with an enlarged portion at its lower extremity, thus forming a shoulder 15. A stop sleeve 16 threaded in the packing gland 14 is adapted to abut the shoulder 15 and prevent upward movement of the valve stem 6.

Thus, the valve being opened to the desired maximum, the stop sleeve 16 may be screwed down to abut the shoulder 15. The valve may then be partially closed or entirely closed to act as a shut-off valve, but the stop sleeve 16 will prevent it being reopened further than the desired maximum. A lock nut 17 is provided to prevent the position of the stop sleeve 16 from being accidentally altered.

It will be understood that I do not limit myself to the exact construction or use shown and described, but claim all constructions and uses within the spirit of my invention and the scope of the appended claims.

I claim:

1. In a valve, the combination of a valve body, a valve seat therein, a valve adapted to seat thereon, a bonnet having threaded attachment to said valve body, a valve stem attached to said valve and having threaded engagement with said bonnet, a shoulder on said valve stem, a packing gland threaded in said bonnet, and a stop sleeve threaded in said packing gland and adapted to abut the shoulder on the valve stem.

2. A pressure reducing valve comprising a valve body, an inlet and an outlet therein, a beveled valve having a diameter substantially greater than said inlet, a flattened area on the interior of said valve body circumjacent said inlet, a beveled portion of said body circumjacent said flattened area forming a valve seat and extending upwardly a considerable distance beyond said valve seat, and means for seating and unseating said valve.

CARL J. KOHLER.